Jan. 15, 1946.   C. E. BROWN   2,392,901
FILTER
Filed March 20, 1943
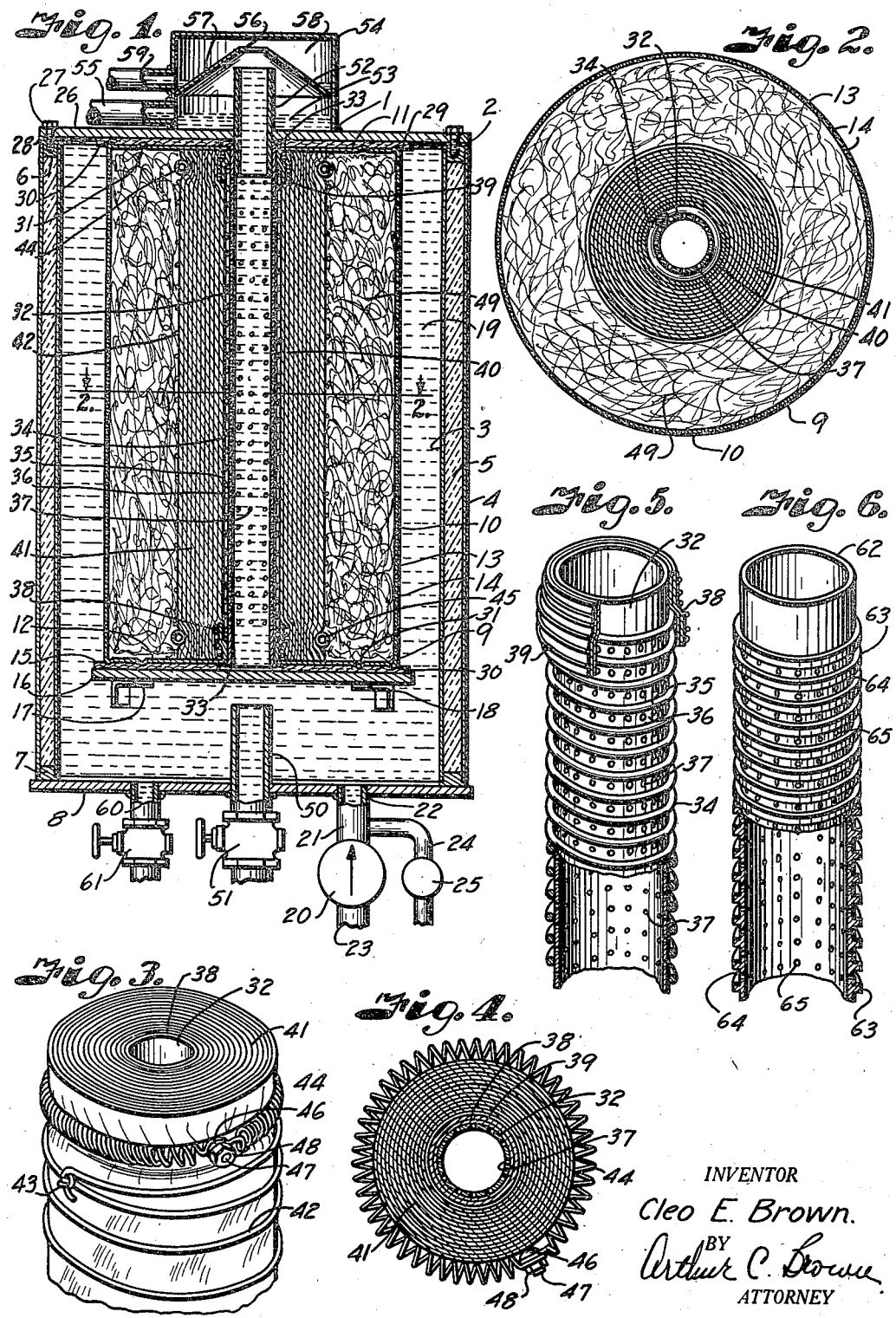
INVENTOR
Cleo E. Brown.
BY Arthur C. Brown
ATTORNEY Patented Jan. 15, 1946

2,392,901

UNITED STATES PATENT OFFICE 2,392,901

FILTER

Cleo E. Brown, Harrisonville, Mo.

Application March 20, 1943, Serial No. 479,866

4 Claims. (Cl. 210—187)

This invention relates to filters and more particularly to pressure filters and elements therein used in pressure circulating systems such as oil reclaimers for purifying lubricating oils contaminated with acids, solid matter, discoloring constituents, and the like, resulting, for example, from use in internal combustion engines, the principal object of the present invention being to provide an efficient, economical filter and element which is particularly adapted for use in pressure systems.

Other important objects of the present invention are to provide a filter which may be easily applied to existing reclaimers and reservoirs; to provide a filter adapted for either continuous or batch operations; to provide an enclosed filter element; to provide a positive filter element for efficiently removing all solid matter at high pressure; to provide a rigid support for the filtering media to prevent collapse at high pressures; to provide a filter element that is sealed against possible breakthrough or seepage around the element at any operating pressure; to provide for distributing the oil over the entire filter element to prevent channeling through the filter media; to provide a spring pressure for holding the ends of the element in sealed condition; to provide a simple outlet connection for the filter; to provide a filter of this character which is simple in construction, reliable and efficient in operation and economical to manufacture; and to provide improved elements and arrangements thereof in the structure of a filter of this character.

In accomplishing these and other objects of the present invention I have provided improved details of structure, the preferred form of which is illustrated in the accompanying drawing, wherein:

Fig. 1 is a vertical view through a filter element embodying the features of the present invention.

Fig. 2 is a transverse sectional view on the line 2—2, Fig. 1.

Fig. 3 is a perspective view of the end of the inner filter element particularly showing the spring seal.

Fig. 4 is a transverse sectional view through the inner filter element seal.

Fig. 5 is a perspective view of the end of the central tube of the filter, portions of the tube being broken away to better illustrate the structure.

Fig. 6 is a perspective view of the end of a modified form of the central tube.

Referring more in detail to the drawing:

1 generally designates a filtering apparatus embodying the features of the present invention and illustrated as used in an oil reclaiming apparatus which preferably includes a receptacle 2 comprising spaced concentrically arranged inner and outer walls 3 and 4 separated by insulating material 5. The upper ends of the receptacle walls are preferably connected by an inner annular retaining ring 6 which may be welded or otherwise secured to the wall in such a manner as to seal the insulating material in a space between the walls. The lower portions of the walls are preferably connected by an annular retaining ring 7 which may be welded or otherwise secured to the walls to support the insulating material between the walls. The lower retaining ring preferably rests on and is secured as by welding on a plate 8 forming the lower end of the receptacle 2.

Mounted in the receptacle is an oil or other liquid purifying filter 9, the principal requisite of which is that it be capable of removing acids, non-lubricating solids and the like from oil passing therethrough. The filter 9 is preferably enclosed in a metal housing 10 having end walls 11 and 12 and a perforated side wall 13, the latter having a sufficient number of perforations 14 to permit free passage of the material being filtered and to enclose the filtering elements and media as later described.

The filtering element is preferably mounted on a gasket of cork or the like 15 supported by a plate 16, of Fig. 1, adapted to seat on inwardly extending flanges 17 of clips 18, which are preferably aligned horizontally and secured as by welding or the like to the inner face of the inner wall 3 of the receptacle.

As a matter of practice, the purifying filter is preferably of less outer diameter than the inner diameter of the receptacle to provide a channel 19 between the receptacle and the filter to permit free flow of oil or other liquid being filtered to completely surround said filter. The oil is delivered to the receptacle by a pump 20 connected to the receptacle by a line 21 preferably welded as at 22 to the bottom plate 8 thereof. The pump 20 is also provided with a suction line 23 connected to a source of supply of oil or other liquid to be filtered, for example, the lubricating oil reservoir of an internal combustion engine (not shown) and is also provided with a by-pass line 24 having a check valve 25 which is preferably adjustable to regulate the pressure acting upon the filter media.

In order to confine the oil in the receptacle and force it through the filter, the receptacle is provided with a top wall or cover 26 secured to the ring 6 by fastening devices 27 with a gasket 28 interposed therebetween.

A gasket 29 preferably of cork or the like is also interposed between the cover 26 and the end wall 11 of the filter housing whereby securing the cover to the ring 6 applies pressure to the gasket to make a tight seal between the filter housing and plate 16 and cover 26. The seal is increased by concentric beads 30 and 31 formed in the end walls of the filter housing and adapted to sink into the gaskets 15 and 29. Cooperating with the filter housing to form a space for filter media is an inner support preferably consisting of a central perforated tube 32 open at both ends and of longer length than the housing 10 whereby the ends of the tube extend through openings 33 in the end walls of said housing and may be soldered or otherwise secured to said end walls to prevent flow of oil thereby.

Sleeved over the perforated tube 32 is a coil spring 34 having its inner diameter preferably engaging the outer surface of the perforated tubes. The convolutions 35 of the spring are spaced as at 36 to provide free access to the perforations 37 in the tube. In order to provide a seal in the ends of the tube to prevent seepage of oil around the ends of the pipe and into spaces between the convolutions of the spiral spring, the ends of the tube are preferably wrapped with a soft material such as flannel 38 extending from the end of the tube over two or more convolutions of the coil spring, said flannel preferably being held in place by a tight wrapping of cord 39 or the like. One or more turns of a flannel sheet 40 or the like is preferably wrapped around the tube and spiral spring and extends over the flannel seal 38 at the ends of the tube to prevent other filtering media from entering the perforations of the tube or otherwise clogging the apparatus. Wound on the outside of the layers of flannel are a plurality of layers of porous sheet filter media such as cellulose paper or the like 41. This paper preferably fills at least a third of the space between the tube 32 and the housing wall 13 and is held in compact condition by means of cords 42 wrapped around said cellulose material and tied as at 43 to securely hold it in place.

It is important that material being filtered does not seep around the ends of the cellulose material, channel between the layers thereof and permit dirt or other solid material to pass through the filter. Therefore, in order to force the material being filtered to pass through all of the layers of the cellulose paper, flannel and the like, the ends of the filter element are held in tightly compressed condition by means of springs 44 and 45 of such length that when they are extended around the filter element, sufficient pressure is applied thereto to effectively seal said element against leakage. In order to hold the springs in place, each end thereof is preferably provided with loops 46 adapted to receive a screw 47 having a nut 48 threaded thereon to hold said springs in encircling relation to the filter element.

The space between the filter element of cellulose paper or the like and the outer wall 13 of the filter housing is preferably filled with a fibrous material such as waste 49 which may be treated with suitable chemicals to neutralize any acids or the like in the material being filtered. As a matter of practice, the pump 20 is maintained at a pressure sufficient to force oil through the filtering element and, depending upon the condition of the purifying element, may be maintained for example at a pressure of approximately one-half to sixty pounds per square inch.

It is also contemplated that over one hundred pounds per square inch may be applied to force the oil through the filter without possibility of break-down or channeling of the oil through the filter.

The oil forced through the filter and into the perforated tube 32 is directed upwardly in the perforated tube 32 and out through an outlet pipe 52 extending through and suitably secured to the cover 26. The pipe 52 preferably extends into the top of the tube 32 and is closely engaged thereby. Any leakage past the connection is taken care of by the gasket 29.

As the oil flows under pressure through the outlet pipe 52, it passes into a clean oil sump 53 or the like formed by a housing 54 suitably secured to the top of the cover 26. The clean oil is preferably discharged through a fitting 55 to the reservoir of the internal combustion engine for recirculation or for suitable storage. Any vapor phase constituents passing through the outlet 52 are directed through an opening 56 in a conical baffle 57 which forms the bottom wall of a separating chamber 58 enclosed by the housing 54. The vapors passing through the opening 56 are condensed in the separating chamber where the liquid phase constituents are collected and are drawn through an outlet 59 for suitable disposal.

The assembly of a filtering apparatus constructed as described is as follows:

The spring 34 is sleeved over the perforated tube 32 and the ends of the tube and spring covered with flannel material 38 which is securely tied in place by the cord 39. The flannel sheet is then wrapped around the spring and the end strips of flannel 38, said flannel then being covered by a plurality of layers of preferably cellulose paper 41 which is securely tied in place by the cord 42.

The spring 44 is applied exteriorly of and adjacent the ends of the cellulose paper to compress same and form a tight seal between the sheets of paper around the ends of the perforated tube 32. This spring is secured by the bolt and nut 47 and 48 respectively, to complete the assembly of the inner filter element.

The assembled inner filter element is placed in the perforated housing 10 with the lower end of the tube 32 extending through the bottom wall 12 where it is soldered in place to make a tight joint. The space between the inner filter element and the perforated wall 13 is then filled with fibrous material such as waste and the top plate 11 is applied to the filter housing and soldered to the wall 13 and to the upper end of the tube 32 whereby the only openings into the housing are through the perforations 14.

The gasket 15 is placed on the plate 16 and the filter inserted in the receptacle 2 and set on the gasket. The gasket 29 is then placed on the top of the filter and the cover 26 and is secured to the receptacle by means of the fastening devices 27 to hold the filter in place and to provide a seal between said filter and the gaskets 29 and 15. The pipe 52 has engagement with the inner portion of the upper end of the tube 32.

The operation of a filtering apparatus constructed and assembled as described is as follows:

The apparatus may be suitably connected with a supply of oil or other material to be filtered, by applying the suction line 23 and the by-pass line 24 to the supply. The pump 20 is then actuated by a suitable prime mover, whereupon oil is drawn from the supply and forced into the receptacle 2. The oil passes through the passage 19 around the filter housing and is forced through the perforations 14, waste 49, cellulose paper 41, layers of flannel 40, between the convolutions 35 of the spring, and through the perforations 37 into the central tube. This passage of the oil through the filter media rids the oil of all non-lubricating solid matter, acids and the like.

During the described passage, this acid is neutralized by a chemical material impregnated in the waste 49.

The filtered oil may then pass upwardly through the pipe 52 into the chamber 53 and is drawn off through the pipe 55. Vapors pass upwardly through the opening 56 for collection in the chamber 58 where they are drawn off through the pipe 59. If desired to replace the filter element, the oil may be drawn directly from the housing through the pipe 50 by opening the valve 51, until the oil level is below the filter element and the cover removed and a new element inserted. When it is necessary to clean the filter, the slug in the reservoir may be drained through a suitable connection 60 by a valve 61.

In the modified form of invention shown in Fig. 6, the central tube 62 is shown as being provided with rings 63 spaced to provide grooves 64 in which perforations 65 are located. The rings 63 serve to support flannel or other layers in spaced condition from the tube 62 to permit oil to flow around the grooves 64 and through the perforations.

It is apparent, therefore, that a convenient, efficient and economical filtering apparatus has been provided by the present invention, that all the filtering media are supported and held in place, and that the possibility of channeling or stoppage of the filter when acting under extreme high pressure is eliminated.

What I claim and desire to secure by Letters Patent is:

1. In an apparatus of the character described, a receptacle having an inlet, means for drawing material to be filtered from a source of supply and supplying said material through said inlet to the receptacle under substantial pressure, a filter housing in the receptacle having perforate side walls and imperforate end walls, a vertically arranged tube extending through the end walls of said housing having its lower end closed and its upper end open, said tube having perforations disposed within the housing and spaced from the ends of the housing, a coil spring sleeved over the perforate portion of the tube, a plurality of layers of cellulose paper wound around the coil spring, said layers of paper extending from end to end of the housing, a coil spring around the cellulose paper to apply pressure adjacent the ends of the cellulose paper to compress said paper around the tube to provide a seal between the paper and the ends of said tube, spaced means surrounding the cellulose paper to hold the paper in compact condition, a fibrous material between said cellulose paper and the side walls of said housing, and means connected to the upper end of the perforate tube extending to the exterior of the receptacle for the removal of filtered material therefrom.

2. In an apparatus of the character described, a receptacle having an inlet, means for drawing material to be filtered from a source of supply and supplying said material through said inlet to the receptacle under substantial pressure, a filter housing in the receptacle having perforate side walls and imperforate end walls, a vertically arranged tube extending through the end walls of said housing having its lower end closed and its upper end open, said tube having perforations disposed within the housing and spaced from the ends of the housing, a coil spring sleeved over the perforate portion of the tube, a filter media around the coil spring surrounding the tube in said housing, a coil spring around the filter media to apply pressure adjacent the ends of the filter media to compress said media around the tube to provide a seal between the filter media and the ends of said tube a cord surrounding the filter media to hold the filter media in compact condition, and a chemically treated fibrous material between said filtering media and the side walls of said housing.

3. In an apparatus of the character described, a receptacle having an inlet, means for drawing material to be filtered from a source of supply and supplying said material through said inlet to the receptacle under substantial pressure, a filter housing in the receptacle having perforate side walls and imperforate end walls, a plate mounted on the side walls of said receptacle for mounting said housing in said receptacle, a gasket between said plate and said housing a vertically arranged tube extending through the end walls of said housing having its lower end closed by said plate and its upper end open, said tube having perforations disposed within the housing and spaced from the ends of the housing, a coil spring sleeved over the perforate portion of the tube, a layer of flannel wound around the imperforate portions of said tube within said housing, a cord for holding said flannel in place a filter media around the coil spring and said flannel surrounding the tube in said housing, a cord surrounding the filter media to hold the filter media in compact condition, a coil spring around the respective ends of said filter media to apply pressure adjacent the ends of the filter media to provide a seal between the filter media and the ends of said tube a chemically treated fibrous material between said filtering media and the side walls of said housing, and means connected to the upper end of the perforate tube extending to the exterior of the receptacle for the removal of filtered material therefrom.

4. In an apparatus of the character described, a receptacle having an inlet, means for drawing material to be filtered from a source of supply and supplying said material through said inlet to the receptacle under substantial pressure, a filter housing in the receptacle having perforate side walls and imperforate end walls, the upper end of said housing engaging the top of the receptacle, a vertically arranged tube extending through the end walls of said housing having its lower end closed and its upper end open, said tube having perforations within the housing and spaced from the ends of the housing, a coil spring sleeved over the perforate portion of the tube, a filter media around the coil spring surrounding the tube in said housing, means for applying pressure to the filter media to compress the filter media around the tube adjacent the imperforate ends of the tube to close all passages through the end of the filter media to the perforate tube, a cord surrounding the filter media to hold the filter media in compact condition means for mounting the housing in the receptacle, gaskets interposed between the top of said housing and said receptacle and the bottom of said housing and said mounting to eliminate seepage of oil to the ends of said tube, and means connected to the upper end of the perforate tube extending to the exterior of the receptacle for the removal of filtered material therefrom.

CLEO E. BROWN.